(12) United States Patent
Tromeur et al.

(10) Patent No.: US 7,758,336 B2
(45) Date of Patent: Jul. 20, 2010

(54) PROCESS FOR THE OXYCOMBUSTION OF A LIQUID FUEL

(75) Inventors: Pascal Tromeur, Cercottes (FR); Remi Tsiava, St Germain les Corbeil (FR); Bertrand Leroux, Issy les Moulineaux (FR); Patrick Jean-Marie Recourt, Marcoussis (FR)

(73) Assignee: L'Air Liquide Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 1069 days.

(21) Appl. No.: 11/300,390

(22) Filed: Dec. 14, 2005

(65) Prior Publication Data

US 2006/0160040 A1 Jul. 20, 2006

(30) Foreign Application Priority Data

Dec. 31, 2004 (FR) .................. 04 53285

(51) Int. Cl.
F23M 3/04 (2006.01)
(52) U.S. Cl. .................. 431/10; 431/8; 431/9
(58) Field of Classification Search .................. 431/10, 431/8, 9, 351
See application file for complete search history.

(56) References Cited

U.S. PATENT DOCUMENTS

| 5,617,997 A | 4/1997 | Kobayashi et al. |
| 5,683,549 A | 11/1997 | Stigsson et al. |
| 2004/0157178 A1 | 8/2004 | Dugue et al. |

FOREIGN PATENT DOCUMENTS

FR 2 853 953 10/2004

OTHER PUBLICATIONS

Translation of FR2853853.*

* cited by examiner

*Primary Examiner*—Alfred Basichas
(74) *Attorney, Agent, or Firm*—Christopher J. Cronin

(57) ABSTRACT

The invention relates to processes for the combustion of liquid fuels, including a means of using an oxygenated gas in a combustion zone, applicable to steam boilers, which produces a longer, more uniform and cooler oxygen flame than a conventional oxygen flame. According to the invention, the liquid fuel is injected into the combustion zone in atomized form, the fuel being atomized by bringing a stream of fuel into contact with a stream of atomizing fluid, and:

- prior to its atomization, the liquid fuel has a viscosity of at least $30 \times 10^{-6}$ m²/s,
- the stream of fuel is brought into contact with the stream of atomizing fluid only in the combustion zone, and
- oxygenated gas is injected into the combustion zone in stages.

11 Claims, 2 Drawing Sheets

PROCESS FOR THE OXYCOMBUSTION OF A LIQUID FUEL

This application claims the benefit of priority under 35 U.S.C. §119 (a) and (b) to French Application No. 0453285, filed Dec. 31, 2004, the entire contents of which are incorporated herein by reference.

BACKGROUND

The present invention relates to a process for the combustion of a high viscosity liquid fuel by means of an oxygenated gas, in particular one that can be used for a steam boiler.

Steam boilers may use various types of fuels: gaseous fuels (natural gas), liquid fuels (heavy fuel oils) or solid fuels (pulverized coal). The oxidizer used on the other hand is at the present time systematically air.

Although it is widely known to use pure or concentrated oxygen in the combustion of any type of fuel in many industries (glass, metallurgy, etc.) this is not used at all in the field of energy production using steam boilers for two main reasons: on the one hand, for an economic reason (cost of oxygen as an oxidant) and on the other hand, for a technical reason which is the problem of transferring heat between the oxygen flame and the steam. However, this type of combustion with oxygen becomes economically attractive since it makes it possible to capture easily, and at moderate cost, the $CO_2$ contained in the fumes, which is a major objective within the environmental context. This transfer problem stems from an absence of nitrogen ballast present in the air, the flame obtained by combustion of fuel and oxygen being shorter and hotter than a flame obtained by the combustion of fuel and air. The heat transfer zone is more restricted and the local heat flux levels may reach values of 600 to 1000 $kW/m^2$, which means higher tube temperatures and therefore problems with materials (corrosion).

In order to get round this problem of high localized flux levels, the solution generally selected is flue gas recycling. This solution makes it possible to replace nitrogen in the air with a high volume of recycled flue gases which once again gives the flame characteristics close to those of an air flame. Obviously this solution is not the optimum one since this flue gas recirculation involves adding a supplementary circuit and a blower. It may also present erosion and corrosion problems.

In addition, in the current context of the oilfield production, the use of liquid fuels and in particular high viscosity liquid fuels (called heavy residues) is becoming increasingly frequent for combustion in boilers.

SUMMARY

The present invention provides a process for the combustion with oxygen of high viscosity liquid fuels that can be used in steam boilers to produce a longer, more uniform and cooler oxygen flame than a conventional oxygen flame.

The present invention also provides a process for combustion with oxygen of high viscosity liquid fuels which makes it possible to avoid flue gas recirculation while using conventional materials.

The present invention relates to a process for the combustion of a liquid fuel by means of an oxygenated gas in a combustion zone, in which the liquid fuel is injected into the combustion zone in atomized form, the fuel being atomized by bringing a stream of fuel into contact with a stream of atomizing fluid, and in which:
  prior to its atomization, the liquid fuel has a viscosity of at least $30 \times 10_{-6}$ $m^2/s$,
  the stream of fuel is brought into contact with the stream of atomizing fluid only in the combustion zone, and
  oxygenated gas is injected into the combustion zone in the form of at least two jets:
    at least one first jet, called the primary oxidizing jet, injected near to the atomized liquid fuel so as to bring about a first incomplete combustion, the products coming from this first combustion still comprising at least part of the fuel,
    at least one second jet, called the secondary oxidizing jet, injected at a distance $l_2$ from the atomized fuel which is greater than the distance $l_1$ between the atomized fuel and the primary oxidizing jet, so as to enter into combustion with that part of the fuel which is present in the products coming from the first combustion.

Other features and advantages of the invention will become apparent on reading the following description. The invention includes methods to achieve the desired results, as described, but is not limited to the various embodiments disclosed.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
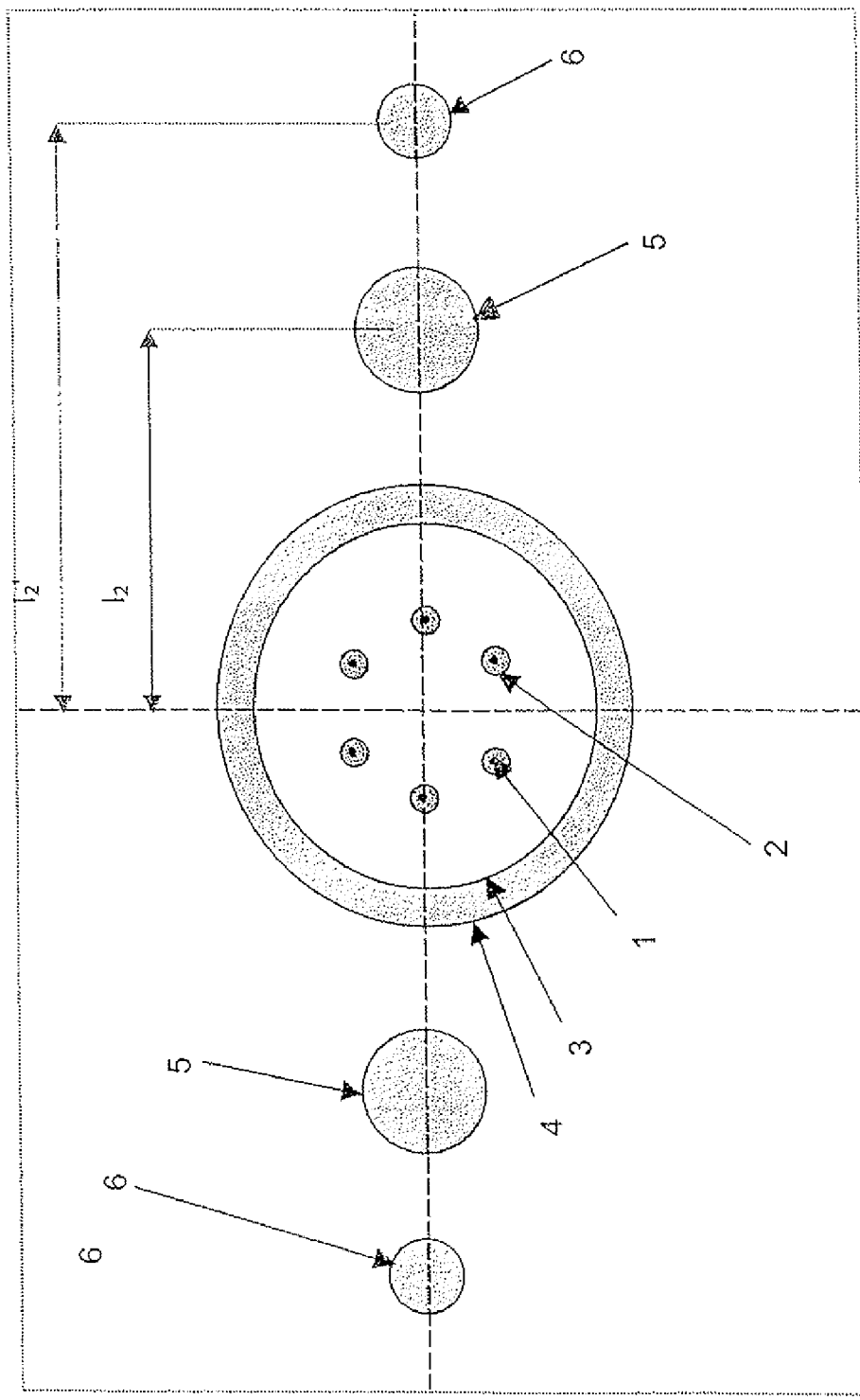
FIG. 1 illustrates a diagrammatic view of a burner for implementing the process according to the invention.

The invention therefore relates to a process for the combustion of a liquid fuel by means of an oxygenated gas in a combustion zone, in which the liquid fuel is injected into the combustion zone in atomized form, the fuel being atomized by bringing a stream of fuel into contact with a stream of atomizing fluid, and in which:
  prior to its atomization, the liquid fuel has a viscosity of at least $30 \times 10^{-6}$ $m^2/s$,
  the stream of fuel is brought into contact with the stream of atomizing fluid only in the combustion zone, and
  oxygenated gas is injected into the combustion zone in the form of at least two jets:
    at least one first jet, called the primary oxidizing jet, injected near to the atomized liquid fuel so as to bring about a first incomplete combustion, the products coming from this first combustion still comprising at least part of the fuel,
    at least one second jet, called the secondary oxidizing jet, injected at a distance $l_2$ from the atomized fuel which is greater than the distance $l_1$ between the atomized fuel and the primary oxidizing jet, so as to enter into combustion with that part of the fuel which is present in the products coming from the first combustion.

The invention relates to the combustion of high viscosity fuels, called heavy residues. At ambient temperature, these fluids are solid or almost solid, and heated to 100° C. they have a viscosity of at least $80 \times 10^{-6}$ $m^2/s$, preferably at least $400.10^{-6}$ $m^2/s$, and still more preferably at least $2000 \times 10^{-6}$ $m^2/s$. They must often be heated so as to have a viscosity that will allow them to be injected into a burner.

According to the process of the invention, combustion involves a liquid fuel that must be atomized prior to its introduction into the combustion zone. The technique for atomizing liquid fuels is well known in the prior art and consists in bringing a stream of fuel into contact with a stream of atomizing fluid. This atomizing fluid may be chosen from the following fluids: steam, air or oxygen. It preferably consists of steam. A first essential feature of the process of the invention is that the liquid fuel should, prior to being brought into contact with the atomizing fluid, have a viscosity of at least $30 \times 10^{-6}$ m²/s, preferably at least $50 \times 10^{-6}$ m²/s, and even more preferably at least $80 \times 10^{-6}$ m²/s. Since the liquid fuel is generally solid at ambient temperature, it is preferably heated in order to liquefy it. This liquefaction is normally carried out in a circuit in a loop containing the continuously heated fuel. The heated fuel is then drawn off from the loop for use in the process according to the invention. The temperature of the heating loop is adjusted so that the desired viscosity (at least $30 \times 10{-6}$ m²/s) for the process is attained. This minimum viscosity of the liquid fuel at the moment it is atomized guarantees that a particular profile for the droplets is obtained. This particular profile, combined with other features of the process, produces a cooler, longer, more uniform oxygen flame than in the prior art. According to the preferred mode, the fuel has a viscosity of between $80 \times 10^{-6}$ m²/s and $200 \times 10^{-6}$ m²/s. In order for the liquid fuel to remain injectable, it is preferable that its viscosity be at most $200 \times 10^{-6}$ m²/s. A second essential feature of the process of the invention is that the stream of fuel should be brought into contact with the stream of atomizing fluid only in the combustion zone. Thus, it is important to prevent the fuel and the atomizing fluid from premixing before they are injected into the combustion zone. The steps of bringing the fuel and atomizing fluid into contact and of atomizing should take place in the combustion zone, the said zone being understood to be the place in which the combustion flame develops. One means of implementation enabling this absence of premixing to be obtained consists of delivering the liquid fuel and the atomizing fluid by means of two coaxial tubes, the inner tube enabling the liquid fuel to be delivered and the outer tube enabling the atomizing fluid to be delivered. Preferably, the ends of these two tubes emerging in the combustion zone are placed substantially in the same plane perpendicular to their central axis.

According to a preferred method, the stream of atomizing fluid has a flow rate 15% by weight lower, preferably 10% lower, than the flow rate of the stream of fuel.

The third essential feature of the invention relates to the injection of oxygenated gas. The latter should be injected into the combustion zone in a staged manner. Thus, the oxygenated gas is divided into several jets injected at various places in the combustion chamber. A first primary jet is injected near to the atomized liquid fuel. "Near to" is understood to mean that this primary jet is as near as possible to the liquid fuel. It may be injected at zero distance or not from the place at which the atomized fuel is injected. This primary jet makes it possible to produce a first incomplete combustion. This incomplete combustion is due to the injection of a sub-stoichiometric quantity of primary oxygen with respect to the quantity of fuel injected. The products coming from this first combustion consequently still comprise at least part of the fuel. The process according to the invention may employ several primary oxidizing jets, all these primary jets being injected at the same distance from the atomized liquid fuel and, in this latter implementation, the primary jets are preferably distributed regularly around the atomized fuel.

A second jet, called the secondary jet, is injected at a distance $l_2$ that is greater than that of the primary jet from the atomized liquid fuel. This secondary jet makes it possible to complete the combustion of the fuel remaining in the products of the first combustion with the primary jet. The quantity of secondary oxygenated gas injected therefore corresponds to the complement of the primary oxygenated gas injected so as to obtain total injection of stoichiometric oxygenated gas with respect to the quantity of fuel injected. The process according to the invention may employ several secondary oxidizing jets, injected at an equal distance from the place at which the atomized fuel is injected, or at different distances. The secondary oxidizing jets, injected at an equal distance from the place at which the fuel is injected, are preferably distributed regularly around the atomized fuel. Preferably, the quantity of oxygen injected into the combustion zone by the primary oxidizing jet represents at most 30%, preferably at most 15%, of the total quantity of oxygen injected into the combustion zone.

According to the invention, oxygenated gas is understood to mean a gas containing at least 80% by volume of oxygen. Preferably, the oxygenated gas employed in the process has an oxygen concentration of at least 95% by volume.

The various features of the process according to the invention, and in particular observance of a viscosity greater than $30 \times 10^{-6}$ m²/s for the liquid fuel, leads to the staged combustion of an atomized fluid of which the dispersion of droplets has the following characteristics:

the mean droplet size is greater than 100 µm, preferably between 150 and 300 µm, and the dispersion of the diameter of the droplets of the dispersion follows the Rosin-Rammler law. The distribution function f(D) of a dispersion (representing at a given point in space the probable number of droplets with a diameter greater than D) is defined, according to the Rosin-Rammler law, by the following formula:

$$f(D) = \exp\left(-\left(\frac{D}{\overline{D}}\right)n\right)$$

where $\overline{D}$ is the mean diameter (the mean Sauter diameter is generally considered) and n is the diffusion parameter.

This combination produces a longer, more uniform and cooler oxygen flame than in the prior art. It enables a very flat heat flow curve to be obtained and therefore makes it possible to avoid flue gas recirculation while using conventional materials.

The process according to the invention also makes it possible to reduce atomizing fluid consumption (as much as −50%).

Finally, the process according to the invention has the advantage of enabling fuel to be injected at a lower temperature than in the prior art.

The process according to the invention is particularly suited to its implementation in a steam boiler.

FIG. 1 illustrates a type of burner for implementing the process according to the invention. The atomized liquid fuel injector of this burner has a cylindrically shaped spray head 3 in which six cylindrical fuel injection nozzles 1 are arranged, each placed coaxially in a cylindrical nozzle 2 for injecting atomizing fluid. All the nozzles emerge on the front surface of the spray head 3 in the combustion zone.

The periphery of the front surface on which nozzles 1, 2 emerge has a frustoconical shape and the nozzles 1, 2 emerge perpendicular to this surface. There is therefore no premixing of the fuel and atomizing fluid. The six orifices are fixed equidistant from the centre of the spray head 3 and equidistant from each other. The nozzles are extended rearwards by conduits designed to supply the liquid fuel and atomizing fluid to the nozzles 1, 2. The burner also has three types of oxygen injector:

- a primary oxygen injector consisting of a tube 4 with a diameter greater than the diameter of the spray head 3 and placed coaxially around this head,
- two secondary oxygen injectors 5 placed at a first distance $l_2$ from the centre of the spray head 3, either side of the said head,
- two other secondary oxygen injectors 6 placed at a second distance $l_2$ ($>l_2$) from the centre of the spray head 3 either side of the said head.

EXAMPLE

The injector of FIG. 1 was employed for the combustion of a liquid fuel with the following characteristics:
nature of the fuel: liquid heavy fuel oil,
viscosity: $40 \times 10^{-6}$ m$^2$/s at 100° C.

After heating to 90° C. in order to obtain a viscosity of $50 \times 10^{-6}$ m$^2$/s, the fuel was injected with a flow rate of 179 kg/h at an injection velocity of 40 m/s. The atomizing fluid was steam having an injection velocity of 200 m/s and an injection flow rate representing 6% by weight of the fuel flow rate, namely 10.74 kg/h.

The oxygenated gas used for combustion had an oxygen concentration greater than 99% by volume. The oxygenated gas was injected with an overall flow rate of 405 Nm$^3$/h and the distribution between the different injectors was as follows:
5% in the primary injector 4,
33% in the secondary injectors 5,
62% in the secondary injectors 6.

Figure 2:
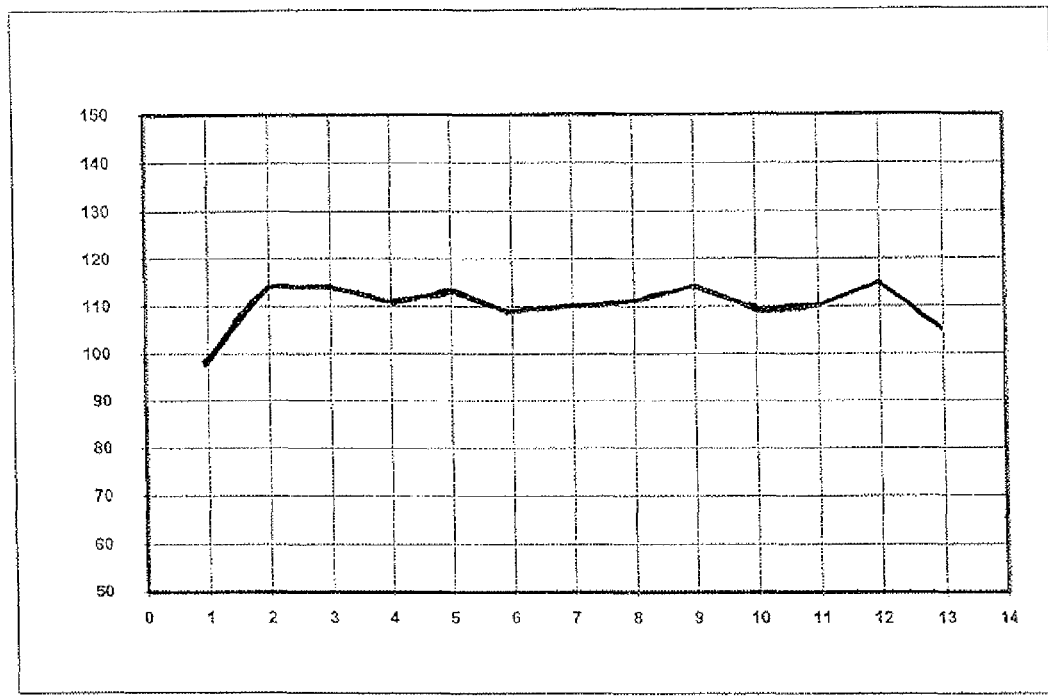
FIG. 2 illustrates the resulting heat flux utilizing one embodiment of the invention.

The curve of FIG. 2 represents the heat flux (kW/m$^2$) obtained by implementing this combustion process, with respect to the distance to the nose of the injector (1 unit along the x-axis representing 0.6 meters). Along the x-axis, each 0.6 meter unit corresponds to a water heater, or heat exchanger, of the boiler. It will be observed that heat transfer was uniform whatever the distance to the nose of the burner.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the combustion of a liquid fuel and an oxygenated gas in a combustion zone comprising the steps of:

a) heating a solid fuel until the solid fuel is liquefied and heating the resultant liquid fuel until the liquid fuel has a desired viscosity of at least $30 \times 10^{-6}$ m$^2$/s, b) injecting the liquid fuel at the desired viscosity as a stream into the combustion zone, c) injecting an atomizing fluid as a stream into the combustion zone, d) bringing the stream of liquid fuel into contact with the stream of atomizing fluid only in the combustion zone, e) injecting oxygenated gas into the combustion zone by at least one primary oxidizing jet near the atomized liquid fuel so as to bring about a first combustion yielding first combustion products comprising at least some uncombusted fuel, and f) injecting oxygenated gas into the combustion zone by at least one secondary oxidizing jet at a distance $l_2$ from the atomized fuel which is greater than the distance $l_1$ between the atomized fuel and the primary oxidizing jet, so as to enter into combustion with at least part of the uncombusted fuel from the first combustion products.

2. The process of claim 1, wherein the the desired viscosity is at least $50 \times 10^{-6}$ m$^2$/s.

3. The process of claim 1, the the desired viscosity is at least $80 \times 10^{-6}$ m$^2$/s.

4. The process of claim 1, wherein the atomizing fluid is steam.

5. The process of claim 1, wherein the liquid fuel and the atomizing fluid are injected through inner and outer coaxial tubes, the liquid fuel being injected through the inner tube and the atomizing fluid being injected through the outer tube.

6. The process of claim 1, wherein the stream of atomizing fluid has a flow rate 15% by weight lower than the flow rate of the stream of fuel.

7. The process of claim 1, wherein the quantity of oxygen injected into the combustion zone by the primary oxidizing jet represents at most 30% of the total quantity of oxygen injected into the combustion zone.

8. The process of claim 1, wherein the oxygenated gas has an oxygen concentration of at least 80% by volume.

9. The process of claim 1, wherein said process is performed in a steam boiler.

10. The process of claim 1, wherein the stream of atomizing fluid has a flow rate 10% by weight lower than the flow rate of the stream of fuel.

11. The process of claim 1, wherein the quantity of oxygen injected into the combustion zone by the primary oxidizing jet represents at most 15% of the total quantity of oxygen injected into the combustion zone.

* * * * *

UNITED STATES PATENT AND TRADEMARK OFFICE
CERTIFICATE OF CORRECTION

| | | |
|---|---|---|
| PATENT NO. | : 7,758,336 B2 | Page 1 of 1 |
| APPLICATION NO. | : 11/300390 | |
| DATED | : July 20, 2010 | |
| INVENTOR(S) | : P. Tromeur et al. | |

It is certified that error appears in the above-identified patent and that said Letters Patent is hereby corrected as shown below:

In the claims:

In Column 6, line 21, claim 2 replace the words "the the" with the word --the--.

In Column 6, line 23, claim 3 replace the words "the the" with the word --the--.

In Column 6, line 23, claim 3 insert the word --wherein-- after "The process of claim 1,".

Signed and Sealed this

Thirtieth Day of November, 2010

David J. Kappos
*Director of the United States Patent and Trademark Office*